June 3, 1952  M. PHILIPPE  2,598,938
MOUNTING OF MOVABLE TABLES ON MACHINE-TOOL BEDS
Filed Aug. 2, 1946  2 SHEETS—SHEET 1
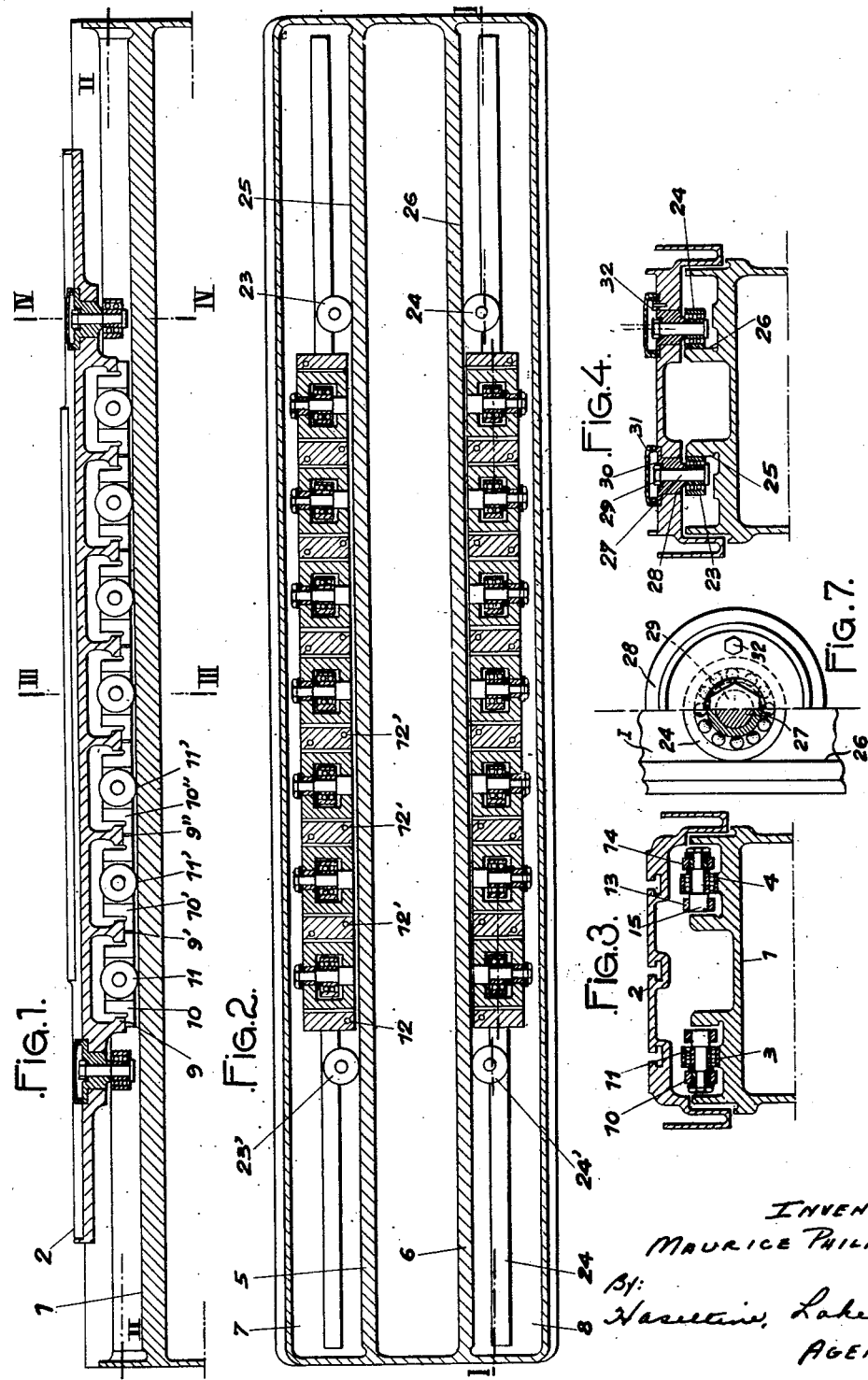
INVENTOR
MAURICE PHILIPPE
BY
Haseltine, Lake & Co.
AGENTS June 3, 1952     M. PHILIPPE     2,598,938
MOUNTING OF MOVABLE TABLES ON MACHINE-TOOL BEDS
Filed Aug. 2, 1946     2 SHEETS—SHEET 2

Inventor
MAURICE PHILIPPE
By Haseltine, Lake & Co.
Attorneys

Patented June 3, 1952

2,598,938

UNITED STATES PATENT OFFICE 2,598,938

MOUNTING OF MOVABLE TABLES ON MACHINE-TOOL BEDS

Maurice Philippe, Courbevoie, France, assignor to Societe Anonyme A. B. G., Paris, France, and Societe Civile d'Etude des Inventions et Procedes Philippe, Paris, France Application August 2, 1946, Serial No. 687,921
In France September 18, 1944

Section 1, Public Law 690, August 8, 1946
Patent expires September 18, 1964

5 Claims. (Cl. 308—6)

1

This invention is more particularly concerned with certain improvements in the mounting of movable tables on machine-tool beds; however, it is of more general appliance and is applicable in all cases where a body is to be supported and guided for straight-line horizontal displacement.

In the known practice, machine-tool tables and carriages are generally mounted by means of slides on the beds or other types of frames. In that simple method, the setting into motion of the table generates a resistance which is so much greater as the faces of the slides are better planed. Moreover, the wear of the surfaces entails the necessity of additional grinding or scraping operations, from time to time, and such operations are lengthy, delicate and costly.

In order to provide a remedy to such drawbacks, it has been suggested to substitute a rolling displacement for the sliding displacement by interposing between the table and the bed ball-bearings, balls or rollers.

The main object of the invention is to provide, in mountings of the character described. a uniform distribution of the stresses upon the table, throughout all the rolling members, this uniform distribution being maintained regardless of the state of wear of the bearing surfaces.

Another object of the invention is to provide, in mountings of the character described, roller bearings mounted on the movable table, independent with respect to each other so as to allow adjustment of their pressure against the corresponding runways provided on the frame of the machine and supported by bearings independently secured on said table, the adjustment being effected by scraping said bearings or inserting spacing members between said bearings and said table, while lateral guiding is also provided for by means of ball bearing rollers journalled on the movable table and displaceable along runways parallel to said first runways but having a different plane, for replacing a conventional longitudinal guiding.

Another object of the invention is to provide, in mountings of the character described, the bearings pressed by their shoes against the horizontal surfaces of vertical ribs cast integral with the table, so that the body of each roller bearing is housed within each recess formed between two adjacent ribs.

Another object of the invention is to provide mountings of the character described wherein the walls of the frame of the machine wherein the runways are adapted or formed determine, with the outer walls of said frame, two oil tight

2 chambers serving as oil containers for the carrier-trains of the movable table.

The invention has for its further object to provide mountings of the character described wherein the roller bearings acting to laterally guide the movable table are provided at each end of the carrier-trains of the movable table with the two roller bearings which are located on one side of a train being pivotally mounted on eccentric bushes or rings to allow for lateral adjustment.

Further advantageous features of the invention will appear in the course of the following description referring to the accompanying drawings given by way of example only and wherein:

Fig. 1 is a general elevation comprising a cross-section along line I—I of Fig. 2.

Fig. 2 is an under-side view of a cross-section along line II—II of Fig. 1.

Fig. 3 is an end view of a cross-section on line III—III of Fig. 1.

Fig. 4 is another end view of a cross-section on line IV—IV of Fig. 1.

Fig. 7 is, at greater scale, a plan view, with partial cross-section, of the clamping device illustrated in the right-hand part of Fig. 4, the cover being omitted.

Figure 5:
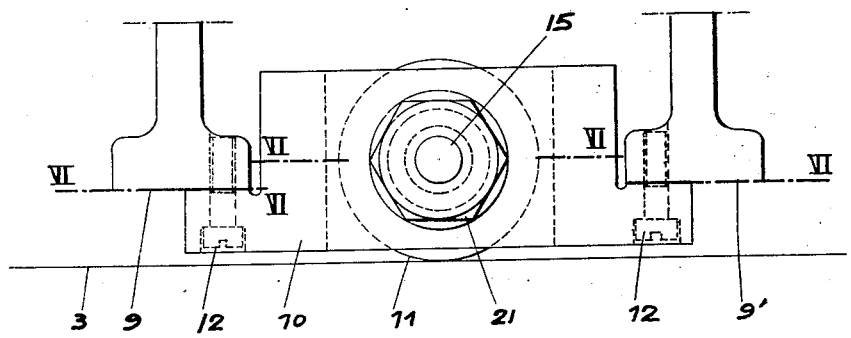
Fig. 5 is an elevation, at a larger scale than the preceding views, of one of the carrier rollers of the movable table of the machine.
Figure 6:
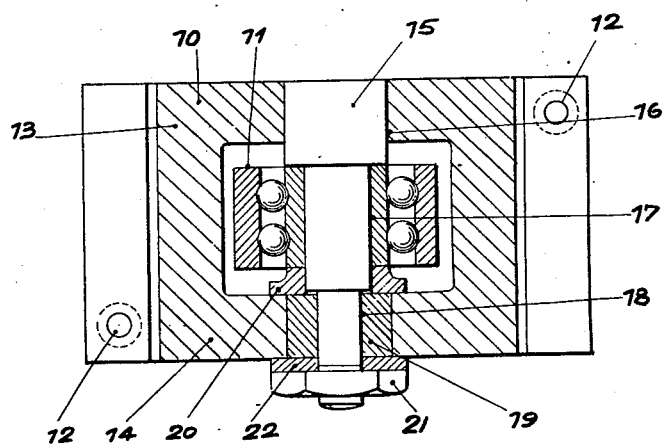
Fig. 6 is a plan view corresponding to Fig. 5 with a cross-section on line VI—VI of Fig. 5.

The frame 1 in fixed relationship with the table 2 is provided with two horizontal runways 3 and 4 perfectly planed by known means and which may be cast integral with the frame or may be constituted by flat members made of treated steel adapted to the frame. Two longitudinal partitions 5 and 6 constitute with the outer walls of the frame 1 two tanks 7 and 8 adapted to contain oil for the lubrication of the carrier roller trains of the movable table 2. The inner face of said table is provided at both sides thereof with a plurality of vertical parallel ribs 9, 9', 9" etc. which are all simultaneously planed and, besides serving as stiffeners, are intended to receive the separate bearings 10, 10', 10" etc. having shoes bearing against said ribs and secured thereto by means of screws 12 having cylindrical heads embedded in the bearings 10 and screwed into the lower shoes of the ribs 9. To facilitate the positioning of each body 10 which carries a double ball-race roller bearing 11, there may be provided on each shoe 9, a small vertical rib having planed lateral surfaces and whereon may be guided, for example, one of the lateral sides of the shoe of a bearing 10. The recesses determined by the ribs 9, 9', 9'' etc. provide for the housing of the body of the bearings 10, 10', 10'' etc. which arrangement offers the advantage of providing satisfactory stability of the movable table 2 and moreover of avoiding an increase in the height of the machine.

Each bearing 10 is provided at the central portion thereof with a recess having a rectangular section for housing the roller-bearings 11, journaled on a pin 15 inserted through two bores of equal diameter provided in the flanges 13 and 14 of the body of the bearing. The roller-bearings 11 are mounted in such a way that the pin 15, while supported within both bores, will be axially held only on one of said flanges 13 or 14.

To this end, the pin 15 is provided with three cylindrical bearing surfaces having decreasing diameter 16, 17 and 18 ending in a threaded shank. The bearing surface 16 is centered in the bore of the flange 13; the bearing surface 17 receives the roller-bearing 11, and the bearing surface 18 having a smaller diameter than the other ones is inserted in a bushing 19 fitted into the bore of the flange 14, while an annular spacing member 20, inserted between the roller bearing 11 and said flange, provides for securing the whole device by means of a nut 21 and a washer 22. In order to adjust the height of each roller bearing 11, so as to ensure that it bears satisfactorily on the runways of the frame 1 of the machine, it is simply necessary, either to grind or to scrape the shoes of the bearings engaging the shoes of the ribs 9 of the movable table, or to insert spacing members between these bearing surfaces.

The transverse guiding of the movable table is obtained by four double-race roller-bearings, for example 23, 23' and 24, 24', the axes of which extend vertically and which are provided at each end of the carrier train. Such roller bearings are displaceable along vertical runways formed by planing or adapted on the inner faces of the partitions 5 and 6, partly constituting the oil tanks 7 and 8. The roller-bearings 23, 23' and 24, 24', are pivotally mounted on axes 27 and secured in a bushing 28 by means of a nut 29 and of a washer 30. The bushing 28 fitted in a bore of the movable table 2 comprises at its upper end a circular chamber of greater diameter, having a cover 31.

The roller-bearings 23 and 23' located at the ends of one of the roller trains have a fixed axis, while the roller bearings 24 and 24' corresponding to the opposite carrier train have an adjustable axis so as to control the lateral play of the table. To this effect, the bushings 28 thereof are eccentrically disposed with respect to the axes 27 and the roller bearing may be adjusted in position by merely causing the bushings 28 to rotate within their housings, a screw 32 for instance in the bottom of the circular recess of the bushing 28 clamping the bushing against the movable table 2 after adjustment.

There could be provided in the same way fixed axes for two of the roller-bearings arranged diagonally such as 23 and 24' or 23' and 24, the two others being adjustable so as to provide compensation for lateral play of the table and to alter the angular position thereof with respect to the frame of the machine.

What I claim as my invention and desire to secure by Letters Patent is:

1. A machine-tool having a fixed bed formed on its upper face with longitudinal horizontal and vertical runways, a table movable with respect to said bed and having regularly spaced vertical ribs formed transversely at its lower face and determining successive recesses, the lower face of said ribs being planed horizontally, anti-friction bearings the outer races of which run along said horizontal runways, carrier means for said bearings wherein the same are rotatable and arranged in respective lines above said horizontal runways, each one of said carrier means being formed at the sides with two lower shoes the upper surfaces of which are horizontally planed to match the lower horizontal surfaces of two consecutive ribs so as to partially close said recesses and permit of adjusting the bearing-pressure of each bearing on the corresponding horizontal runway, roller means carried by said movable table rotatable about vertical axes and adapted to run on said vertical runways, and means for adjusting the lateral position of at least one of said roller means.

2. A machine-tool having a fixed bed formed on its upper face with longitudinal horizontal and vertical runways, a table movable with respect to said bed and having regularly spaced vertical ribs formed transversely at its lower face and determining successive recesses, the lower face of said ribs being planed horizontally, first set of anti-friction bearings the outer races of which run along said horizontal runways, carrier means for said bearings wherein the same are rotatable and arranged in respective lines above said horizontal runways, each one of said carrier means being formed at the sides with two lower shoes the upper surfaces of which are horizontally planed to match the lower horizontal surfaces of two consecutive ribs so as to partially close said recesses and permit of adjusting the bearing-pressure of each bearing on the corresponding horizontal runway, a second set of anti-friction bearings carried by said table and the outer races of which run along said vertical runways, and means for adjusting the lateral position of the axis of at least one of the bearings of said second set.

3. A machine-tool having a fixed bed formed on its upper face with longitudinal horizontal and vertical runways, a table movable with respect to said bed and having regularly spaced vertical ribs formed transversely at its lower face and determining successive recesses, the lower face of said ribs being planed horizontally, a first set of anti-friction bearings the outer races of which run along said horizontal runways, carrier means for said bearings wherein the same are rotatable and arranged in respective lines above said horizontal runways, each one of said carrier means being formed at the sides with two lower shoes the upper surfaces of which are horizontally planed to match the lower horizontal surfaces of two consecutive ribs so as to partially close said recesses and permit of adjusting the bearing-pressure of each bearing on the corresponding horizontal runway, horizontal pivotal pins supported by said carrier means for journalling said bearings, a second set of anti-friction bearings carried by said table and the outer races of which run along said vertical runways, a vertical pivotal pin for journalling each bearing of said second set, and means for adjusting the lateral position of the axis of one at least of the bearings of said second set, said means comprising for each adjustable bearing an eccentric bushing located in a bore provided in the table and through which is mounted the pivotal pin of the corresponding bearing, and a screw for clamping said eccentric bushing in said table in the angular position required for the lateral setting of said table.

4. In a machine-tool, in combination, a fixed bed the upper face of which is surrounded by upwards extending vertical longitudinal and transversal walls and comprises two inner longitudinal vertical walls respectively formed with two vertical runways and defining with the outer longitudinal vertical walls two longitudinal side-compartments adapted to contain oil for lubricating purposes, the upper surface of said bed being formed with two horizontal longitudinal runways respectively located in said compartments, a table movable with respect to said bed and having regularly spaced vertical ribs formed transversely at its lower face and determining successive recesses, the lower face of said ribs being planed horizontally, anti-friction bearings the outer races of which run along said horizontal runways, carrier means for said bearings wherein the same are rotatable and arranged in respective lines above said horizontal runways, each one of said carrier means being formed at the sides with two lower shoes the upper surfaces of which are horizontally planed to match the lower horizontal surfaces of two consecutive ribs so as to partially close said recesses and permit of adjusting the bearing-pressure of each bearing on the corresponding horizontal runway, roller means carried by said movable table rotatable about vertical axes and adapted to run on said vertical runways, and means for adjusting the lateral position of at least one of said roller means.

5. In a machine-tool, in combination, a fixed bed the upper face of which is surrounded by upwards extending vertical longitudinal and transversal walls and comprises two inner longitudinal vertical walls respectively formed with two vertical runways and defining with the outer longitudinal vertical walls two longitudinal side-compartments adapted to contain oil for lubricating purposes, the upper surface of said bed being formed with two horizontal longitudinal runways respectively located in said compartments, a table movable with respect to said bed and having regularly spaced vertical ribs formed transversely at is lower face and determining successive recesses, the lower face of said ribs being planed horizontally, a first set of anti-friction bearings the outer races of which run along said horizontal runways, carrier means for said bearings arranged in two parallel rows respectively in line above said horizontal runways and wherein said bearings are rotatable, each one of said carrier means being formed at the sides with two lower shoes the upper surfaces of which are horizontally planed to match the lower horizontal surfaces of two consecutive ribs so as to partially close said recesses and permit of adjusting the bearing-pressure of each bearing on the corresponding horizontal runways so that a positive adjustment of very high precision is obtained, a second set of anti-friction bearings carried by said table and the outer races of which run along said vertical runways, the bearings of said second set being disposed at every end of the two rows formed by the bearings of said first set, a vertical pivotal pin for each bearing of said second set, and means for adjusting the lateral position of two of the bearings of said second set diagonally disposed with respect to each other, said means comprising, for each one of said two adjustable bearings, an eccentric bushing located in a bore provided in the table and through which is mounted the pivotal pin of the corresponding bearing, and a screw for clamping said eccentric bushing in said table in the angular position required for the lateral setting of said table.

MAURICE PHILIPPE.

REFERENCES CITED

The following references are of record in the file of this patent:

UNITED STATES PATENTS

| Number | Name | Date |
| --- | --- | --- |
| 286,997 | Campbell | Oct. 23, 1883 |
| 1,381,188 | Gury | June 14, 1921 |
| 1,773,679 | Jackson et al. | Aug. 19, 1930 |
| 1,811,508 | Klages | June 23, 1931 |
| 2,309,298 | Bickel | Jan. 26, 1943 |
| 2,353,088 | Schutz | July 4, 1944 |

FOREIGN PATENTS

| Number | Country | Date |
| --- | --- | --- |
| 713,501 | Germany | Oct. 16, 1941 |